United States Patent [19]
Bliss

[11] 3,930,587
[45] Jan. 6, 1976

[54] RETRACTABLE CHAIN LIFTING DEVICE

[76] Inventor: George N. Bliss, P.O. Box 1, Renton, Wash. 98055

[22] Filed: Apr. 12, 1973

[21] Appl. No.: 350,360

[52] U.S. Cl. ............ 214/730; 214/16.4 A; 59/78.1; 214/750; 74/245 R
[51] Int. Cl.² ..................................... B65G 47/00
[58] Field of Search....... 214/730, 731, 750, 16.4 R, 214/16.4 A, 34; 59/78, 78.1; 74/245 R, 250 R

[56] References Cited
UNITED STATES PATENTS

| | | | |
|---|---|---|---|
| 2,574,045 | 11/1951 | Lapham | 214/750 X |
| 2,869,379 | 1/1959 | Welser | 74/245 R |
| 3,070,248 | 12/1962 | Mitchell | 214/750 X |
| 3,098,349 | 7/1963 | Waninger | 59/78.1 |
| 3,239,088 | 3/1966 | Sano | 214/730 |
| 3,566,603 | 3/1971 | Chadwick | 59/78.1 |
| 3,709,394 | 1/1973 | Strandberg et al. | 214/750 |

FOREIGN PATENTS OR APPLICATIONS

| | | | |
|---|---|---|---|
| 898,832 | 12/1953 | Germany | 59/78 |
| 1,069,529 | 11/1959 | Germany | 214/750 |
| 1,072,557 | 12/1959 | Germany | 214/730 |
| 1,179,513 | 10/1964 | Germany | 214/16.4 A |
| 1,257,488 | 12/1971 | United Kingdom | 214/730 |

*Primary Examiner*—Robert J. Spar
*Assistant Examiner*—R. B. Johnson
*Attorney, Agent, or Firm*—Seed, Berry, Vernon & Baynham

[57] ABSTRACT

A unique retractable lifting device includes a plurality of modular overlapping links joined by connecting pins and having central stabilizer pins. The links are retractable into a vertical plane and are extendible into a self-supporting horizontal plane.

4 Claims, 11 Drawing Figures

RETRACTABLE CHAIN LIFTING DEVICE

BACKGROUND OF THE INVENTION

1. Field of the Invention

This invention pertains to warehousing techniques and to retractable chain link lifting devices.

2. Description of the Prior Art

Heretofore the customary warehousing technique for palletized or otherwise vertically separated objects is to either pigeon-hole the objects in vertical shelves or stack the palletized objects on one another in vertical rows. In both instances, the aisles separating the rows must be wide enough to provide access for a forklift or a conveying mechanism having forklift arms so that the forklift arms can remove an object and pass with it through the aisle to a discharge station. The forklift arms in these prior art devices of necessity require an aisle width wide enough to handle the object. In some cases, extra room is even provided in the aisle so that the forklift truck can turn 90° to transport the object down the aisle. In a typical illustration, an aisle 6 foot in width is customarily employed for handling objects only 4 feet in depth. As a result of these handling techniques as much of the warehouse space is consumed by the aisle width as is storage space and increases the expense necessary for storing objects.

As mentioned above, conventional forklifts employ solid arms which require an aisle width at least as great as the object under which the arms are to be inserted. Some attempts have been made to provide completely retractable fork lift arms however none has been successful. Examples of such devices are shown in U.S. Pat. Nos. 3,709,394 and 2,574,045. Other retractable chain link devices, such as booms, are also generally not satisfactory for forklift operations since the chains are retracted into a coil having a substantial, horizontal diameter and thus consumed almost as much space as solid telescopic forklift arms. Furthermore, known chain link booms are expensive to manufacture, complicated to operate and maintain, and are difficult to modify to increase or vary their lifting capacity.

SUMMARY OF THE INVENTION

It is an object of this invention to provide an improved warehousing system.

It is another object of this invention to provide a warehousing system in which objects vertically spaced in columns can be moved by being lifted from below and carried over the tops of the columns.

It is another object of this invention to provide a warehousing system using narrow aisles.

It is still another object of this invention to provide a warehousing system in which the width of the aisle is substantially less than the depth of the object being conveyed.

Basically these objects are obtained in their broadest form by providing a plurality of rows or columns of vertically spaced objects with aisles separating two adjacent columns. Space is provided above the columns of a height greater than the height of the objects so that objects can be conveyed from the columns by movement over the tops of the columns to a discharge point. Lift arm means is provided for moving into an aisle and engaging the object from below to lift it over the tops of the columns.

In one form of the invention, the aisles are of a narrow width much less than the horizontal depth of the objects. In this system, retractable chain link forks are employed which when retracted are of a length substantially less than the object but when extended, fit well beneath the object to be lifted. In another form the forks are part rigid and partly retractable chain links.

As is readily apparent, the overhead warehousing system having narrow aisles increases the floorspace area of the warehouse usable for storing objects. Moving the objects overhead of the stored columns of objects, provides a safer moving zone free of pedestrian traffice. In the embodiment having aisles large enough to accommodate the object to be moved, the aisle can still be reduced over customary widths, since a width only slightly greater than the horizontal depth of the object is necessary rather than a greater width to provide maneuverability of the forklift as is conventional. By retracting the chain link forks into a vertical plane, the overall horizontal width of the lifting device is minimized.

It is another object of this invention to provide a high strength retractable chain link lifting device.

Basically, this object is accomplished by providing a plurality of sections of interconnected links having bearing surfaces which, when engaged, will self-support the links in a horizontal plane. The links are retractable about a horizontal axis into a vertical plane thus reducing the overall horizontal width of the device. Central stabilizing pins prevent the links from rocking out of the horizontal plane to keep the tops of all the links in a uniform horizontal plane.

DESCRIPTION OF THE PREFERRED EMBODIMENTS

Figure 1:
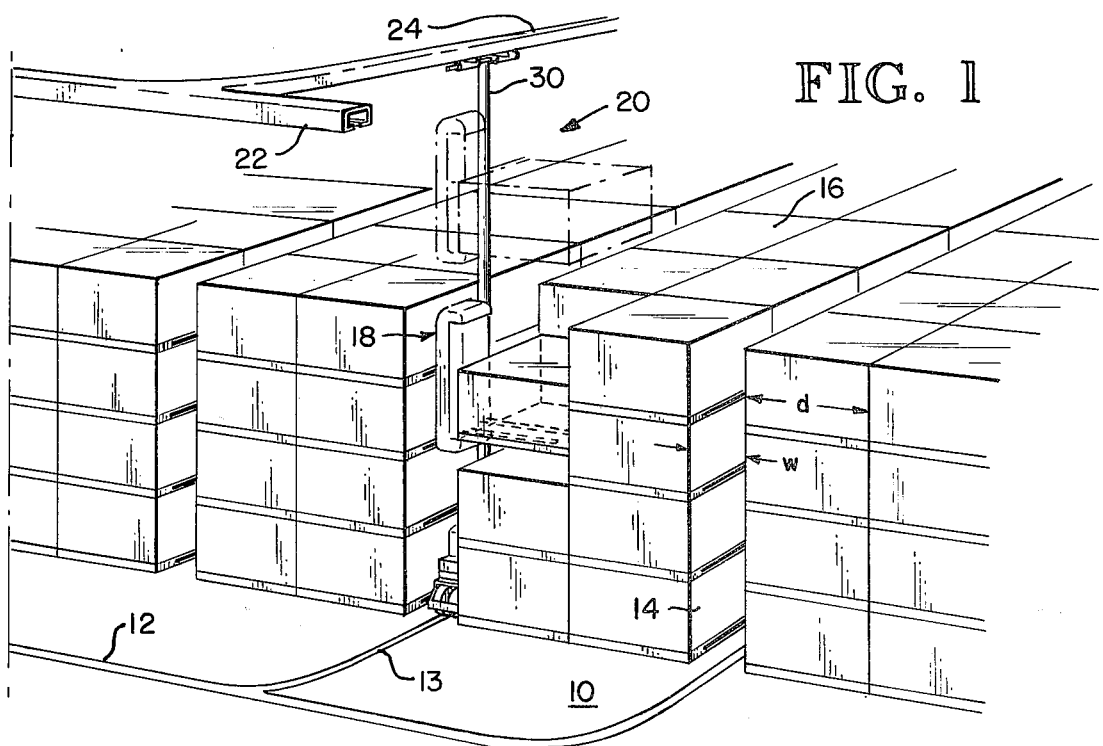
FIG. 1 illustrates a warehousing system embodying the principles of the invention.
Figures 2, 3:
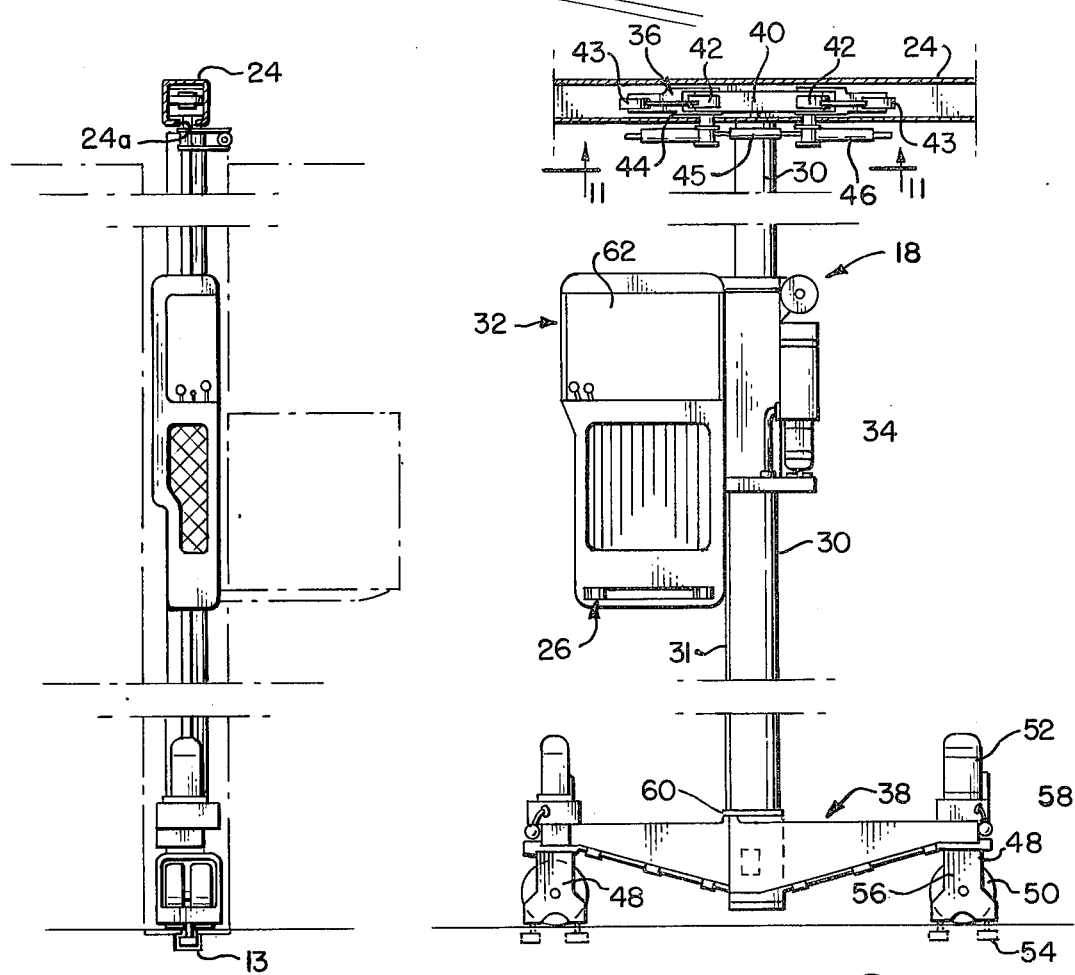
FIG. 2 is a side elevational view of the warehousing system shown in FIG. 1.
FIG. 3 is a front elevational view of the lifting device employed in the warehousing system of FIG. 1.

The warehousing system of this invention is best illustrated in FIG. 1 and includes a floor 10 having a main lower track 12 and a plurality of lateral tracks 13 which pass through aisles 14 between stacks or columns of vertically spaced objects 16. Preferably the objects are palletized in a well known manner to provide access for forks of a lifting device 18. Provided above the stacks is an enlarged handling space 20 between the top of the stacks and the roof of the warehouse. An upper maintrack 22 and a plurality of lateral upper tracks 24 are provided in the handling space parallel to the lower tracks 12 and 13. The tracks guide the lifting device 18 as it raises an object into the handling space and carries the object to a discharge point in the warehouse.

Figure 4:
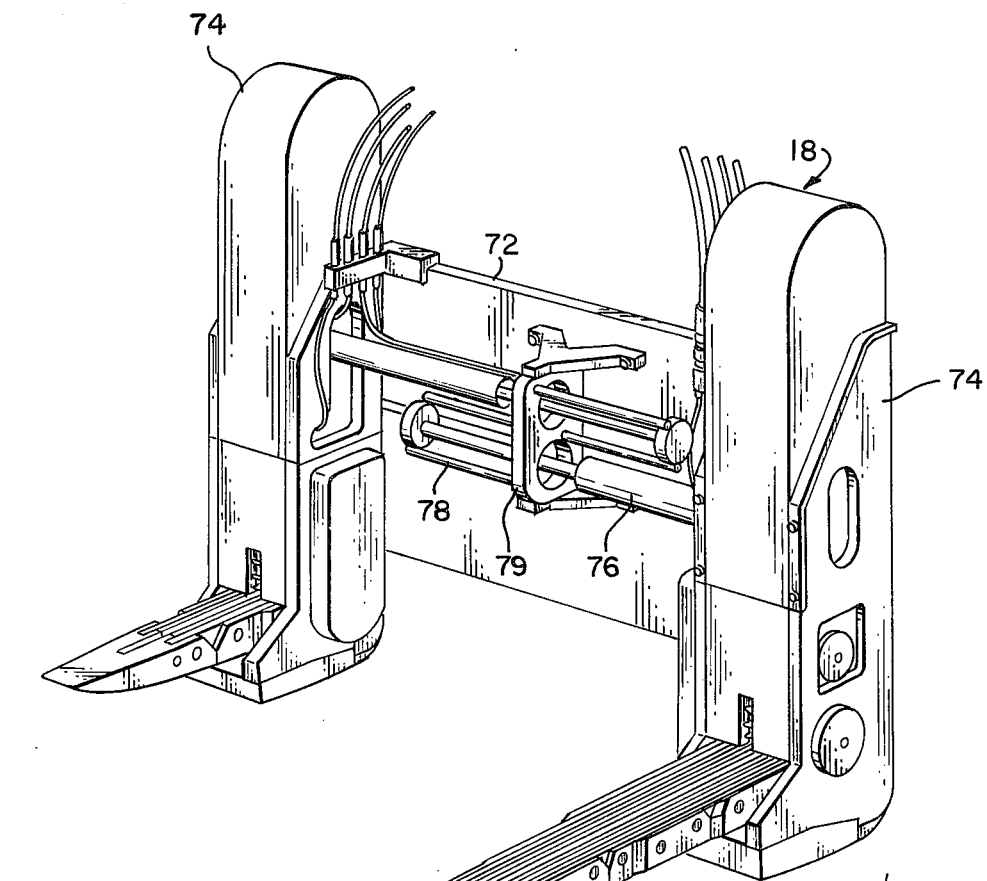
FIG. 4 is a perspective fragmentary illustration of a preferred form of retractable chain link lifting device.
Figure 5:
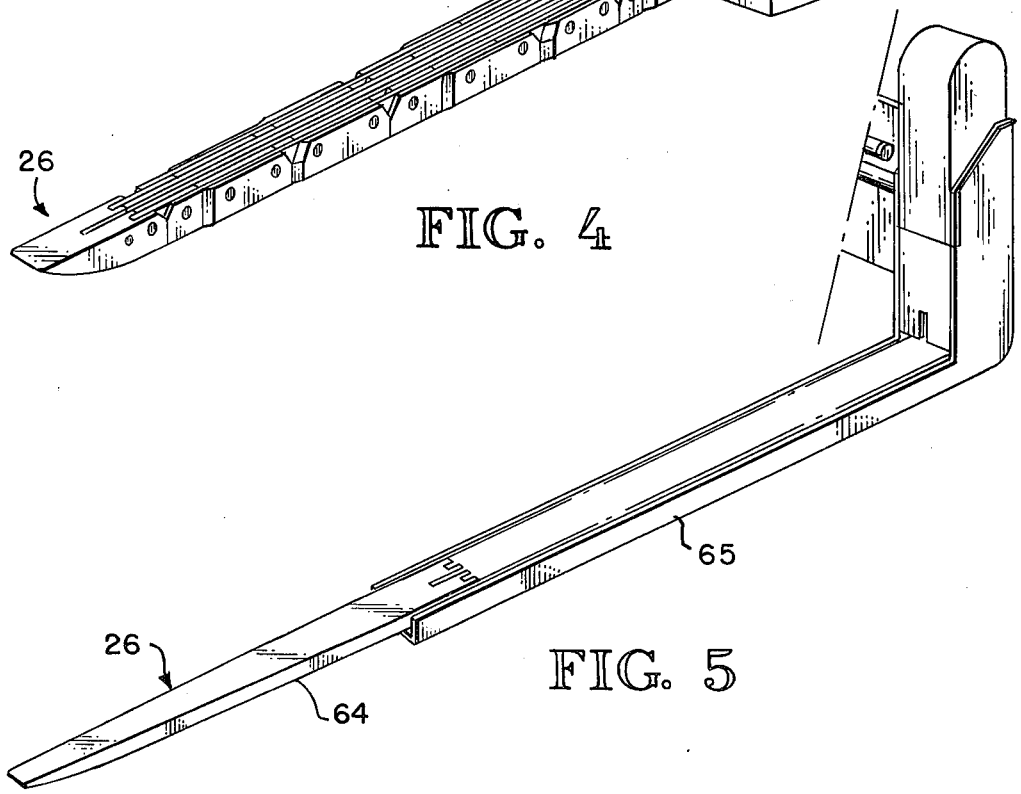
FIG. 5 is a fragmentary perspective of a modified form of lifting device.
Figure 6:
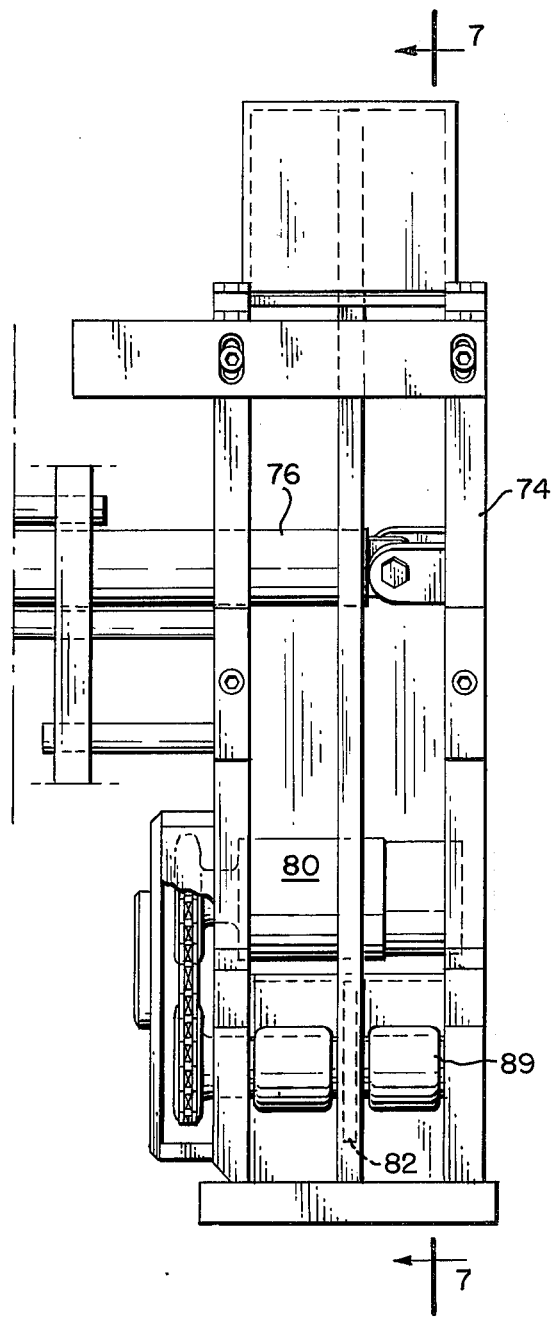
FIG. 6 is a fragmentary front elevation of the lifting device shown in FIG. 4.
Figure 7:
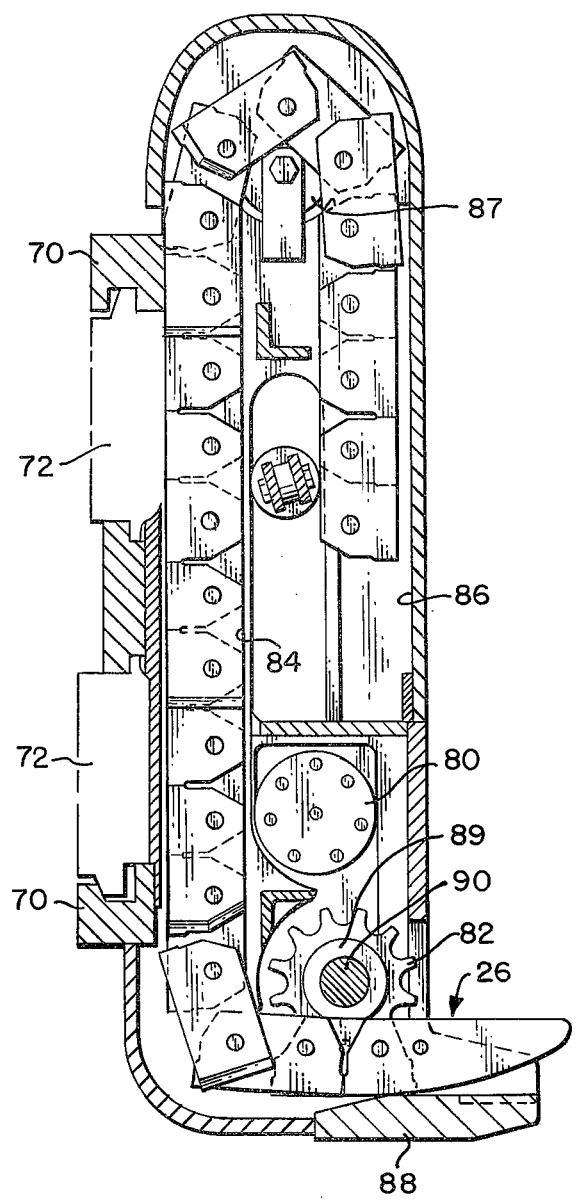
FIG. 7 is a fragmentary vertical section taken along the line 7—7 of FIG. 6.

As will be described in more detail herein below the lifting device 18 in the preferred embodiment has a pair of chain forks 26 which are extendible in the horizontal plane as shown in FIG. 4 and which can be retracted into a vertical plane as shown in FIG. 7. Retraction of the chain forks into the vertical plane as shown in FIG. 7 reduces the horizontal depth of the lifting device such that the horizontal width of the aisle 14 can be as small as two feet.

To best understand the invention a typical example of a warehousing system will be described. Assume the objects have a horizontal depth "$d$" equal to three or four times the width of the aisle "$w$". For example, if $d = 6'$ $w$ may = only $2'$. Movement of the lifting device 18 back and forth through the aisles is accomplished with the chain forks retracted. When the chain forks are positioned squarely in front of the topmost object to be removed, the forks are extended beneath the object. Next the object is raised above the stack into the handling area and carried away to a discharge point.

In the preferred form of the invention, the lifting device includes a vertical support post 30 having a conventional climber chaim 31. The post supports a carrier 32 which is moved along the post by the climber chain. The chain forks 26 are powered by an hydraulic pump motor unit.

The vertical post 30 is supported between the tracks 12, 13, 22 and 24 by upper and lower trolley mechansims 36 and 38 respectively. Upper tracks 22 and 24 have generally hollow square cross-section with a continuous opening such as 24a. Upper trolley mechanism 36 includes a bracket 40 that mounts a pair of guide rollers 42 which ride inside the square track. A pair of steering rollers 43 are supported by levers 44 which are pivoted by a two-directional ram 45 and are spring biased into the centered position by two spring centering load cylinders 46. Introduction of pressure to one side of the cylinder 45 will spread the lever arms to arc the four rollers in one direction whereas pressure introduced on the opposite end of cylinder 45 will cause the rollers to arc in the opposite direction thus providing steering control for the mast. The spring centering cylinders include springs pressing against washers 47 which are engaged by a boss on the piston rods of the cylinder 45. Thus de-pressurization of cylinder 45 allows the springs to center the rollers 43. Power and control signalization can be provided to the mast in any conventional manner.

The lower trolley 38 includes two longitudinally spaced stands 48. The stands are basically identical in construction and only one will be described. Each stand includes a pair of laterally spaced rubber tires 50 that carry the main weight of the lifting device and are powered by an hydraulic motor pump unit 52. A pair of longitudinally spaced guide rollers 54 ride in the lower tracks 13 and 12 to guide the wheels 50. For this purpose, the wheels are mounted in pivotable wheel assemblies 56 which can be pivoted to the limits of the guide rollers 54 by a suitable solenoid or other device 58. In this manner the lifting device can be propelled along the track and upon a response of a control signal the wheels can be turned in the desired direction to negotiate a turn.

In order to give the lifting device more versatility the vertical post or mast 30 is rotatably mounted in the upper and lower trolley assemblies 36 and 38 and is provided with a solenoid or other rotary actuator 60 to rotate the post 30. The carrier 32 is also conveniently provided with an operator's station 62 for controlling the position of the carrier and the chain forks 26.

As is readily apparent, the narrow width $w$ of the aisle 14 allows more of the warehouse space to be used efficiently for storage rather than for handling of the objects. Secondly, the overhead handling space provides a safe and efficient manner of handling the objects. While the warehousing system is more efficiently used in the manner illustrated in FIG. 1, it can also be used for warehouses having conventional wide aisles where pigeonholing of the objects into vertically spaced shelves is desired. Preferably in such a configuration, chain forks 26 would be provided with an outer partially rigid fork 64, approximately the width of the object being conveyed, a brace 65 and an extendable chain form 26, identical to that of the preferred embodiments, would be used to extend the outer rigid fork into the stack to remove the object. In this case, obviously, the objects can be handled entirely in the aisle.

An important feature of this invention, is the lifting device 18 alone when used as a chain fork, chain boom or the like. The chain device will be referred and described specifically for use as a chain fork for purposes of this description, but is not intended to be limited thereto.

In the preferred embodiment the chain forks are mounted on the carrier means 18 which is provided with a par of slides 70 that ride on a frame 72. The frame 72 may be integrally secured to a conventional mobile forklift vehicle or to the carrier means 18 of the warehousing system. The fork chains are carried in housing 74 which are basically identical in structure and therefore only one will be described. Each housing 74 is provided with an hydraulic ram 76 that is connected on one end to the housing and has its piston rod connected to a framework 78 that is secured to a bracket 79. The bracket 79 is in turn secured to the rigid member 72. Thus operation of the ram 76 will shift the housing 74 laterally to best position the fork chains beneath the object to be carried.

Each housing is provided with an independently operable hydraulic motor 80 that powers a sprocket 82. The chain fork is housed in the vertically stored position in a pair of guide channels 84 and 86 and about an idler sprocket 87. The fork chain is supported at the discharge end of the housing on a horizontal wear plate 88. When extended, the chain fork is cantilevered about the wear plate and provides an upward moment against a pair of support rollers 89. The sprocket is keyed to a shaft 90 and the rollers 89 are free to rotate on the shaft 90 relative thereto so that compensation is made for changes in the relative angular velocities of the points of contact with the sprocket and rollers on the pins and links of the chains.

Figure 8:
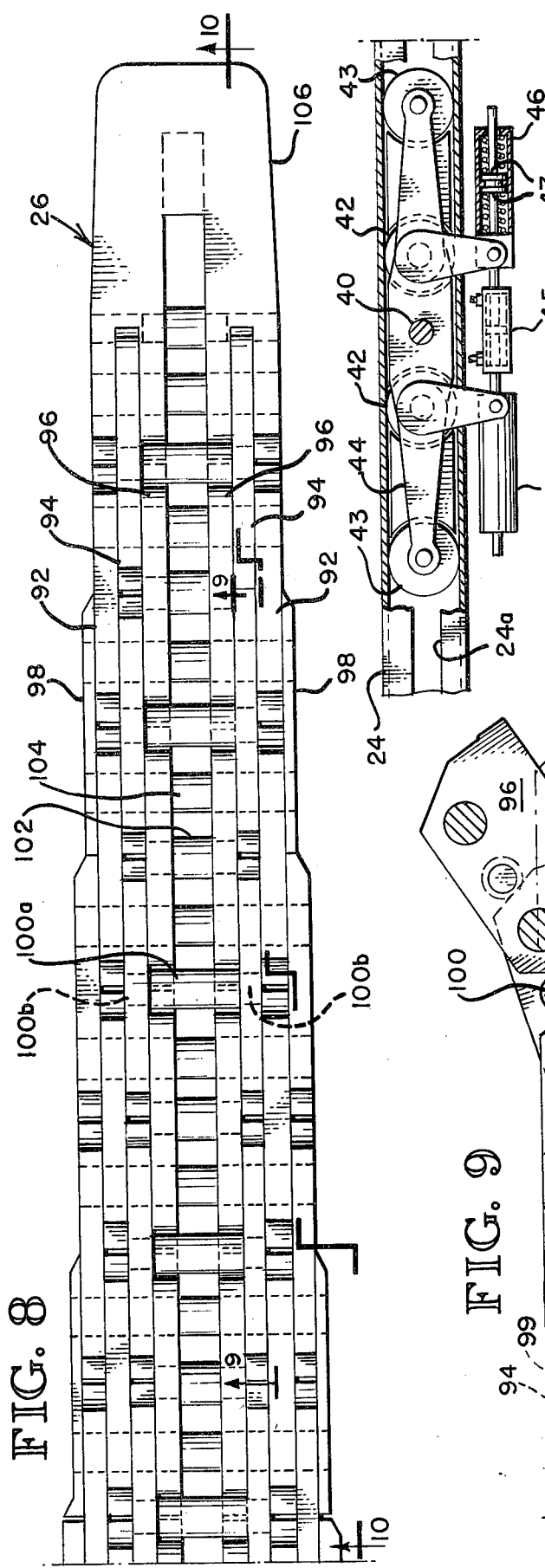
FIG. 8 is a plan view of a portion of the lifting device shown in FIG. 4.
Figure 9:
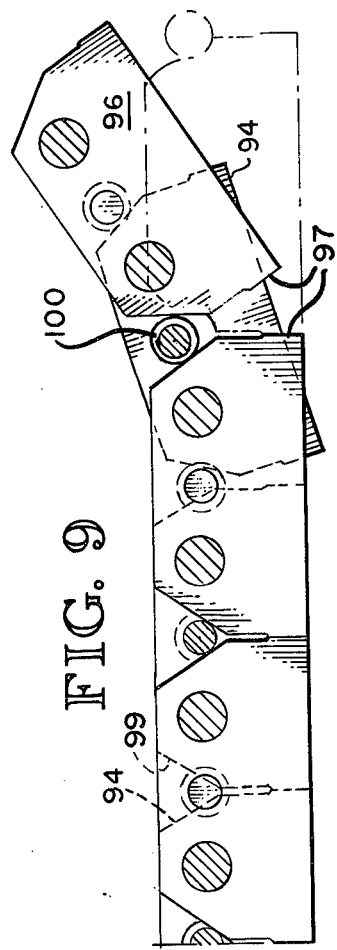
FIG. 9 is a fragmentary section taken along the line 9—9 of FIG. 8.
Figure 10:
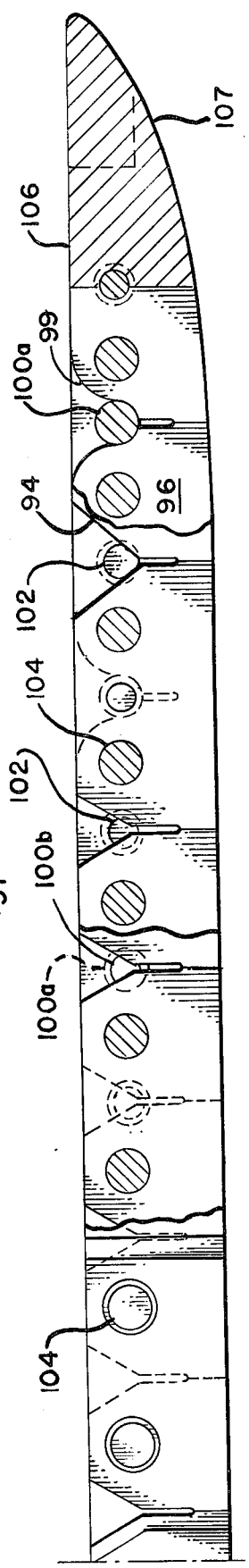
FIG. 10 is a fragmentary section taken along the line 10—10 of FIG. 8.
Figure 11:
FIG. 11 is a fragmentary bottom plan of a portion of the system.

The chain fork 26 itself will now be described with its several unique features. First it is of a modular construction so that its strength can be increased merely by adding additional modular units to its side. Secondly, it provides a maximum bearing strength between the links so that it can be cantilevered a substantial distance and carry substantial loads. Thirdly, it employs a unique stabilizing and drive link arrangement. The unique link arrangement is best shown in FIGS. 8–10 and includes left and right outer standard links 92, left and right-hand inner standard links 94, left and right-hand stabilizer links 96, and left and right half width side links 98. As is shown in FIG. 8, additional standard links can be inserted to increase the overall width of the chain fork. The half-width side links are provided to give the chain fork a taper to avoid hooking the chain fork on objects when being extended and retracted. The standard and stabilizer links are the primary load carrying members of the chain fork. Each of the links has opposed bearing surface 97, that abut one another to make the links self supporting when extended. In addition, the stabilizing links 96 are provided with recesses 99 which abut against stabilizing pins 100. The stabilizing pins 100 include an enlarged body portion 100a and opposite ends 100b. The shoulder formed by the enlarged body portion 100a, abuts against the side walls of the adjacent left and right-hand inner standard links to provide lateral stability to the fork chain. The enlarged body portion 100a abuts against the recessed edges 99 of adjacent stabilizer links to provide longitudinal stability to the fork chain. In addition, the stabilizer pin is engaged by the sprocket 82 and serves as a feed pin for advancing and retracting the fork chain.

In addition to the stabilizing pins, the fork chain is provided with spacer pins 102 and folding pins 104. The spacer pins also provide lateral stability to the stabilizer links and are engageable by the sprocket for feeding and retracting the fork chain. The folding pins couple all of the links together and are retained by snap rings 104 in a conventional manner. Finally, a nose plate 106 is provided with a tapered surface 107 to make the forks slide easily beneath an object to be carried.

The link and pin arrangement uniquely provides a readily flexible but high strength self-supporting chain mechanism which can be readily expanded to various widths. The stabilizer pins 100 prevent the left and right-hand inner standard links from shifting in opposite directions in the vertical plane relative to one another thus keeping the top surfaces of all links in a uniform plane. While the chain has been disclosed in use as a fork lift, it should be readily understood that by expanding its width the chain can become a retractable table or it can be used as a boom. If inverted, the chain can be used as a beam.

While the preferred embodiments of the invention have been illustrated, it should be understood that modifications and variations will be apparent to those skilled in the art without departing from the principles of the invention. Accordingly, the invention is not to be limited to the preferred embodiments illustrated and described.

The embodiments of the invention in which an exclusive property or privilege is claimed are defined as follows:

1. A retractable forklift device comprising frame means, means for moving said frame means for carrying objects to different locations, retractable fork means on said frame means and means for extending and retracting said fork means, said fork means including collapsible links extendible outwardly in a substantially horizontal plane and being self-supporting and proportionately sharing the weight of the object when extended, said links each having an upper object-supporting surface slidable beneath an object for supporting the object, said links including a plurality of longitudinally aligned standard links having sides and opposite ends, the opposite ends of the longitudinally aligned standard links having peripheral surfaces, with such peripheral surfaces of adjacent standard links abutting one another, and a plurality of longitudinally aligned stabilizing links transversely adjacent said standard links, said stabilizing links having sides and opposite ends, the opposite ends of the longitudinally aligned stabilizing links having peripheral surfaces, with such peripheral surfaces of adjacent stabilizing links abutting one another, folding pins joining said transversely adjacent stabilizing and standard links, said stabilizing links overlapping the ends of said standard links and having outwardly opening recesses adjoining said peripheral end surfaces of said stabilizing link opposite ends, and stabilizing pins having opposite end portions mounted in transversely aligned standard links and having central portions abutting the recesses of said longitudinally adjacent stabilizing links for holding the standard and stabilizing links flat when said standard and stabilizing links are extended.

2. The forklift device of claim 1, said standard links including longitudinal rows of sets of transversely spaced and aligned links, said sides of said standard links in the transversely innermost set of standard links including confronting side portions, said stabilizing pins central portions including enlarged shoulders having lateral surfaces abutting the confronting side portions of said innermost set of standard links.

3. The forklift device of claim 2, said means for extending and retracting said fork means including a sprocket mounted for rotation about an axis and further including spacer pins between said folding pins and said stabilizing pins, said spacer pins, folding pins and stabilizing pins being engageable by said sprocket for extending and retracting the stabilizing and standard links, roller means mounted for rotation about said sprocket axis independently of said sprocket and having peripheral surface means engageable with the upper object-supporting surfaces of said links for providing a bearing support to counter the load-applying moment on said links and to compensate for changes in the relative angular velocities between the points of contact of the sprocket and rollers on the pins and the object-supporting surfaces of the links, respectively.

4. The forklift device of claim 1, said stabilizing links lying centrally in a longitudinal row of confronting sets and having spacer pins separating the stabilizing links in each set, said standard links including a first longitudinal row of sets of aligned, transversely spaced links, each standard link of said sets having a side portion confronting the corresponding side portion of the other link in said set of said first row, said stabilizing pins including enlarged shoulder having end surfaces abutting the inner confronting said portions of said set of standard links, and including additional longitudinal rows of sets of aligned, transversely spaced standard links, each row of additional standard link sets being spaced adjacent, transversely outward of and in overlapping relation to the next innermost row of standard link sets for increasing the load-carrying strength of said fork means.

* * * * *